US010803692B2

(12) United States Patent
Manessis

(10) Patent No.: US 10,803,692 B2
(45) Date of Patent: *Oct. 13, 2020

(54) SYSTEM AND METHOD FOR AUTHORIZING FINANCIAL TRANSACTIONS WITH ONLINE MERCHANTS

(71) Applicant: Visa U.S.A. Inc., San Francisco, CA (US)

(72) Inventor: Thomas Manessis, Pacifica, CA (US)

(73) Assignee: Visa U.S.A. Inc., San Francisco, CA (US)

(*) Notice: Subject to any disclaimer, the term of this patent is extended or adjusted under 35 U.S.C. 154(b) by 79 days.

This patent is subject to a terminal disclaimer.

(21) Appl. No.: 15/993,196

(22) Filed: May 30, 2018

(65) Prior Publication Data

US 2018/0276936 A1 Sep. 27, 2018

Related U.S. Application Data

(63) Continuation of application No. 12/483,419, filed on Jun. 12, 2009, now Pat. No. 10,008,067.
(Continued)

(51) Int. Cl.
*G07F 7/12* (2006.01)
*G06Q 20/20* (2012.01)
(Continued)

(52) U.S. Cl.
CPC .............. *G07F 7/122* (2013.01); *G06Q 20/20* (2013.01); *G06Q 20/341* (2013.01); *G06Q 20/40* (2013.01);
(Continued)

(58) Field of Classification Search
CPC .... G06Q 20/32; G06Q 20/20; G06Q 20/3829; G06Q 20/401; G06Q 20/4018; H04L 2209/56; H04M 17/30
See application file for complete search history.

(56) References Cited

U.S. PATENT DOCUMENTS 4,423,287 A 12/1983 Zeidler
4,578,530 A 3/1986 Zeidler
(Continued)

FOREIGN PATENT DOCUMENTS

KR 19990078937 11/1999
KR 20050089427 9/2005

OTHER PUBLICATIONS

U.S. Appl. No. 12/032,495 , "Final Office Action", dated Feb. 4, 2010, 11 pages.
(Continued)

*Primary Examiner* — Mohammad Z Shaikh
(74) *Attorney, Agent, or Firm* — Kilpatrick Townsend & Stockton LLP

(57) ABSTRACT

A system for authorizing a financial transaction of a financial presentation device such as a credit or debit card being presented from a customer to an online merchant. The system includes a peripheral device having a processor configured to generate a dynamic verification value for the card which changes for each financial transaction, and to transmit the dynamic verification value to a user computer via an I/O interface during an online transaction. The system also includes an authentication computer having a memory for storing information used to generate a comparison verification value, a communication device for receiving the dynamic verification value originating from the peripheral device, a processor and an authentication module executable by the processor adapted to generate the comparison verification value using information stored in memory. The authentication computer determines whether to authorize the financial transaction based on whether the comparison verification value matches the received dynamic verification value.

5 Claims, 5 Drawing Sheets

Related U.S. Application Data

(60) Provisional application No. 61/061,936, filed on Jun. 16, 2008.

(51) Int. Cl.
  *G06Q 20/34*  (2012.01)
  *G06Q 20/40*  (2012.01)
  *G07F 7/10*  (2006.01)

(52) U.S. Cl.
  CPC ... *G06Q 20/4093* (2013.01); *G06Q 20/40975* (2013.01); *G07F 7/1008* (2013.01)

(56) References Cited

U.S. PATENT DOCUMENTS

| | | | |
|---|---|---|---|
| 4,646,351 A | 2/1987 | Asbo et al. | |
| 4,701,601 A | 10/1987 | Francini et al. | |
| 4,734,564 A | 3/1988 | Boston et al. | |
| 4,812,628 A | 3/1989 | Boston et al. | |
| 4,822,985 A | 4/1989 | Boggan et al. | |
| 4,870,259 A | 9/1989 | Boggan et al. | |
| 4,906,826 A | 3/1990 | Spencer | |
| 4,908,521 A | 3/1990 | Boggan et al. | |
| 4,943,707 A | 7/1990 | Boggan | |
| 5,276,311 A | 1/1994 | Hennige | |
| 5,396,624 A | 3/1995 | Campbell, Jr. | |
| 5,450,491 A | 9/1995 | McNair | |
| 5,450,537 A | 9/1995 | Hirai et al. | |
| 5,465,206 A | 11/1995 | Hilt et al. | |
| 5,477,038 A | 12/1995 | Levine et al. | |
| 5,500,512 A | 3/1996 | Langhans et al. | |
| 5,500,513 A | 3/1996 | Langhans et al. | |
| 5,621,201 A | 4/1997 | Langhans et al. | |
| 5,623,552 A | 4/1997 | Lane | |
| 5,627,355 A * | 5/1997 | Rahman | G06K 19/07 235/375 |
| 5,640,577 A | 6/1997 | Scharmer | |
| 5,703,344 A | 12/1997 | Bezy et al. | |
| 5,742,845 A | 4/1998 | Wagner | |
| 5,771,101 A | 6/1998 | Bramall | |
| 5,794,259 A | 8/1998 | Kikinis | |
| 5,883,810 A | 3/1999 | Franklin et al. | |
| 5,920,847 A | 7/1999 | Kolling et al. | |
| 5,963,925 A | 10/1999 | Kolling et al. | |
| 5,974,430 A | 10/1999 | Mutschler, III et al. | |
| RE36,365 E | 11/1999 | Levine et al. | |
| 6,000,832 A | 12/1999 | Franklin et al. | |
| 6,003,014 A | 12/1999 | Lee et al. | |
| 6,003,763 A | 12/1999 | Gallagher et al. | |
| 6,005,942 A | 12/1999 | Chan et al. | |
| 6,018,717 A | 1/2000 | Lee et al. | |
| 6,019,284 A | 2/2000 | Freeman et al. | |
| 6,044,349 A | 3/2000 | Tolopka et al. | |
| 6,067,621 A | 5/2000 | Yu et al. | |
| RE37,122 E | 4/2001 | Levine et al. | |
| 6,227,447 B1 | 5/2001 | Campisano | |
| 6,233,683 B1 | 5/2001 | Chan et al. | |
| 6,247,129 B1 | 6/2001 | Keathley et al. | |
| 6,263,446 B1 | 7/2001 | Kausik et al. | |
| 6,282,522 B1 | 8/2001 | Davis et al. | |
| 6,285,991 B1 | 9/2001 | Powar | |
| 6,298,336 B1 | 10/2001 | Davis et al. | |
| 6,341,724 B2 | 1/2002 | Campisano | |
| 6,367,011 B1 | 4/2002 | Lee et al. | |
| 6,385,595 B1 | 5/2002 | Kolling et al. | |
| 6,408,284 B1 | 6/2002 | Hilt et al. | |
| 6,421,729 B1 | 7/2002 | Paltenghe et al. | |
| 6,438,527 B1 | 8/2002 | Powar | |
| 6,481,632 B2 | 11/2002 | Wentker et al. | |
| 6,490,601 B1 | 12/2002 | Markus et al. | |
| 6,499,042 B1 | 12/2002 | Markus | |
| 6,560,581 B1 | 5/2003 | Fox et al. | |
| 6,571,339 B1 | 5/2003 | Danneels et al. | |
| RE38,255 E | 9/2003 | Levine et al. | |
| 6,808,111 B2 | 10/2004 | Kashef et al. | |
| 6,850,996 B2 | 2/2005 | Wagner | |
| 6,873,974 B1 | 3/2005 | Schutzer | |
| 6,907,476 B2 | 6/2005 | Wagner | |
| 6,925,562 B2 * | 8/2005 | Gulcu | G06F 21/88 380/231 |
| 6,980,970 B2 | 12/2005 | Krueger et al. | |
| 6,985,583 B1 * | 1/2006 | Brainard | G06F 21/31 380/277 |
| 7,007,840 B2 | 3/2006 | Davis | |
| 7,028,008 B2 | 4/2006 | Powar | |
| 7,039,611 B2 | 5/2006 | Devine | |
| 7,051,929 B2 | 5/2006 | Li | |
| 7,062,706 B2 | 6/2006 | Maxwell et al. | |
| 7,096,363 B2 * | 8/2006 | Kon | G06Q 20/40 705/44 |
| 7,099,850 B1 | 8/2006 | Mann, II et al. | |
| 7,103,576 B2 | 9/2006 | Mann, III et al. | |
| 7,159,180 B2 | 1/2007 | Ward | |
| 7,177,848 B2 | 2/2007 | Hogan et al. | |
| 7,210,169 B2 | 4/2007 | Smith et al. | |
| 7,216,292 B1 | 5/2007 | Snapper et al. | |
| 7,227,950 B2 | 6/2007 | Faith et al. | |
| 7,231,045 B1 | 6/2007 | Parrott | |
| 7,243,853 B1 | 7/2007 | Levy et al. | |
| 7,247,033 B2 * | 7/2007 | Skowranek | H01R 12/75 439/709 |
| 7,254,569 B2 | 8/2007 | Goodman et al. | |
| 7,257,581 B1 | 8/2007 | Steele et al. | |
| 7,275,263 B2 | 9/2007 | Bajikar et al. | |
| 7,280,981 B2 | 10/2007 | Huang et al. | |
| 7,328,850 B2 | 2/2008 | Sines | |
| 7,334,184 B1 | 2/2008 | Simons | |
| 7,343,351 B1 | 3/2008 | Bishop et al. | |
| 7,346,587 B2 | 3/2008 | Goldstein et al. | |
| 7,347,361 B2 | 3/2008 | Lovett | |
| 7,350,139 B1 * | 3/2008 | Simons | G06F 40/174 715/224 |
| 7,356,516 B2 | 4/2008 | Richey et al. | |
| 7,356,706 B2 | 4/2008 | Scheurich | |
| 7,366,703 B2 | 4/2008 | Gray et al. | |
| 7,379,919 B2 | 5/2008 | Hogan et al. | |
| 7,412,420 B2 | 8/2008 | Holdsworth | |
| 7,415,443 B2 | 8/2008 | Hobson et al. | |
| 7,427,033 B1 * | 9/2008 | Roskind | G06F 21/34 235/380 |
| 7,437,575 B2 | 10/2008 | Dennis et al. | |
| 7,437,757 B2 | 10/2008 | Holdsworth | |
| 7,483,845 B2 | 1/2009 | Vetelainen | |
| 7,506,818 B2 * | 3/2009 | Beenau | G06K 7/10128 235/487 |
| 7,512,975 B2 | 3/2009 | Aissi | |
| 7,533,063 B2 | 5/2009 | Kianian | |
| 7,533,828 B2 | 5/2009 | Ong | |
| 7,568,631 B2 | 8/2009 | Gibbs et al. | |
| 7,584,153 B2 * | 9/2009 | Brown | G07F 7/1083 235/380 |
| 7,593,875 B2 * | 9/2009 | Granite | G06Q 20/10 705/35 |
| 7,627,531 B2 | 12/2009 | Breck et al. | |
| 7,660,779 B2 | 2/2010 | Goodman et al. | |
| 7,664,699 B1 | 2/2010 | Powell | |
| 7,689,459 B2 | 3/2010 | Capurso et al. | |
| 7,693,790 B2 * | 4/2010 | Lawlor | G06Q 20/04 705/35 |
| 7,716,596 B2 | 5/2010 | Cao et al. | |
| 7,740,168 B2 * | 6/2010 | Hammad | G06Q 20/04 235/379 |
| 7,761,374 B2 * | 7/2010 | Sahota | G06Q 20/10 705/39 |
| 7,849,014 B2 | 12/2010 | Erikson | |
| 7,866,551 B2 | 1/2011 | Manessis et al. | |
| 7,891,560 B2 * | 2/2011 | Hammad | G06F 21/31 235/382 |
| 7,899,753 B1 * | 3/2011 | Everhart | G06Q 20/0855 705/67 |
| 7,922,082 B2 * | 4/2011 | Muscato | G06Q 20/10 235/380 |
| 8,313,022 B2 | 11/2012 | Hammad et al. | |

(56) References Cited

U.S. PATENT DOCUMENTS

| | | | |
|---|---|---|---|
| 8,313,822 B2* | 11/2012 | Hatakenaka | C09J 133/08 428/172 |
| 8,326,759 B2* | 12/2012 | Hammad | G06Q 20/322 235/380 |
| 8,359,630 B2* | 1/2013 | Manessis | G06Q 20/04 726/2 |
| 8,364,594 B2* | 1/2013 | Hammad | G06Q 20/3552 705/30 |
| 8,423,415 B2* | 4/2013 | Sahota | G06Q 20/4093 705/16 |
| 8,504,451 B2* | 8/2013 | Faith | G06Q 20/20 705/35 |
| 8,534,564 B2* | 9/2013 | Hammad | G06Q 20/352 235/492 |
| 8,602,293 B2* | 12/2013 | Hammad | G06Q 20/12 235/375 |
| 8,931,691 B2 | 1/2015 | Manessis et al. | |
| 9,251,637 B2* | 2/2016 | Ashfield | G06Q 20/24 |
| 10,008,067 B2* | 6/2018 | Manessis | G06Q 20/20 |
| 2001/0032182 A1 | 10/2001 | Kumar et al. | |
| 2001/0054148 A1 | 12/2001 | Hoornaert et al. | |
| 2002/0111919 A1 | 8/2002 | Weller et al. | |
| 2002/0116330 A1* | 8/2002 | Hed | G06Q 20/3415 705/39 |
| 2002/0153424 A1 | 10/2002 | Li | |
| 2002/0158747 A1* | 10/2002 | McGregor | G05B 19/0425 340/5.26 |
| 2002/0161704 A1 | 10/2002 | Powar | |
| 2002/0178112 A1 | 11/2002 | Goeller et al. | |
| 2002/0180584 A1* | 12/2002 | McGregor | G07C 9/257 340/5.26 |
| 2002/0194138 A1 | 12/2002 | Dominguez et al. | |
| 2002/0194503 A1 | 12/2002 | Faith et al. | |
| 2003/0105964 A1* | 6/2003 | Brainard | H04L 9/3297 713/178 |
| 2003/0115142 A1 | 6/2003 | Brickell et al. | |
| 2003/0120593 A1 | 6/2003 | Bansal et al. | |
| 2003/0182241 A1* | 9/2003 | Everhart | G07F 7/1016 705/65 |
| 2003/0195843 A1 | 10/2003 | Matsuda et al. | |
| 2003/0200184 A1 | 10/2003 | Dominguez et al. | |
| 2003/0212642 A1 | 11/2003 | Weller et al. | |
| 2003/0233292 A1 | 12/2003 | Richey et al. | |
| 2004/0044621 A1 | 3/2004 | Huang et al. | |
| 2004/0059688 A1 | 3/2004 | Dominguez et al. | |
| 2004/0210566 A1 | 10/2004 | Smith et al. | |
| 2004/0220964 A1 | 11/2004 | Shiftan et al. | |
| 2004/0230489 A1* | 11/2004 | Goldthwaite | G06Q 20/12 705/26.1 |
| 2005/0015588 A1* | 1/2005 | Lin | G06F 21/34 713/159 |
| 2005/0029344 A1 | 2/2005 | Davis | |
| 2005/0036611 A1 | 2/2005 | Seaton, Jr. et al. | |
| 2005/0043997 A1* | 2/2005 | Sahota | G06Q 20/4018 705/16 |
| 2005/0077349 A1* | 4/2005 | Bonalle | G06Q 20/10 235/380 |
| 2005/0102234 A1 | 5/2005 | Devine | |
| 2005/0149455 A1 | 7/2005 | Bruesewitz et al. | |
| 2005/0154877 A1 | 7/2005 | Trench | |
| 2005/0171898 A1* | 8/2005 | Bishop | G06Q 20/00 705/39 |
| 2005/0177510 A1 | 8/2005 | Hilt et al. | |
| 2005/0246278 A1 | 11/2005 | Gerber et al. | |
| 2005/0250473 A1* | 11/2005 | Brown | H04L 9/3226 455/411 |
| 2005/0269402 A1* | 12/2005 | Spitzer | G07F 7/0886 235/380 |
| 2006/0006224 A1 | 1/2006 | Modi | |
| 2006/0049263 A1 | 3/2006 | Ou et al. | |
| 2006/0131393 A1 | 6/2006 | Cok et al. | |
| 2006/0152484 A1* | 7/2006 | Rolus Borgward | G06F 3/03543 345/157 |
| 2006/0161789 A1 | 7/2006 | Doughty et al. | |
| 2006/0167784 A1* | 7/2006 | Hoffberg | G06Q 20/401 705/37 |
| 2006/0179007 A1 | 8/2006 | Davis | |
| 2006/0218098 A1 | 9/2006 | Walker et al. | |
| 2006/0237528 A1* | 10/2006 | Bishop | G06Q 20/385 235/380 |
| 2006/0278698 A1* | 12/2006 | Lovett | G06Q 20/24 235/380 |
| 2007/0005613 A1 | 1/2007 | Singh et al. | |
| 2007/0005774 A1 | 1/2007 | Singh et al. | |
| 2007/0055597 A1 | 3/2007 | Patel et al. | |
| 2007/0055630 A1 | 3/2007 | Gauthier et al. | |
| 2007/0100691 A1 | 5/2007 | Patterson | |
| 2007/0136211 A1* | 6/2007 | Brown | G07F 7/12 705/75 |
| 2007/0143605 A1 | 6/2007 | Metke et al. | |
| 2007/0208671 A1 | 9/2007 | Brown et al. | |
| 2007/0241183 A1* | 10/2007 | Brown | G07F 7/1008 235/380 |
| 2007/0278291 A1* | 12/2007 | Rans | G06Q 20/341 235/380 |
| 2008/0029593 A1* | 2/2008 | Hammad | G06Q 20/388 235/380 |
| 2008/0029607 A1* | 2/2008 | Mullen | G06Q 20/401 235/492 |
| 2008/0034221 A1 | 2/2008 | Hammad et al. | |
| 2008/0040285 A1* | 2/2008 | Wankmueller | G06Q 20/3674 705/67 |
| 2008/0071680 A1 | 3/2008 | Sheets | |
| 2008/0071682 A1 | 3/2008 | Dominguez | |
| 2008/0091619 A1 | 4/2008 | Perlman et al. | |
| 2008/0110983 A1* | 5/2008 | Ashfield | G06Q 20/24 235/382 |
| 2008/0120236 A1* | 5/2008 | Faith | G06Q 30/04 705/44 |
| 2008/0167991 A1 | 7/2008 | Carlson et al. | |
| 2008/0177796 A1 | 7/2008 | Eldering | |
| 2008/0197201 A1 | 8/2008 | Manessis et al. | |
| 2008/0203151 A1 | 8/2008 | Dixon et al. | |
| 2008/0203152 A1 | 8/2008 | Hammad et al. | |
| 2008/0203170 A1 | 8/2008 | Hammad et al. | |
| 2008/0228653 A1 | 9/2008 | Holdsworth | |
| 2008/0289022 A1 | 11/2008 | Chiu | |
| 2008/0306850 A1* | 12/2008 | Horvath | G06Q 20/4016 705/35 |
| 2009/0006646 A1 | 1/2009 | Duarte | |
| 2009/0031407 A1* | 1/2009 | Kuang | G06F 21/31 726/7 |
| 2009/0055893 A1* | 2/2009 | Manessis | G06Q 20/4018 726/2 |
| 2009/0065571 A1* | 3/2009 | Jain | G06Q 20/3227 235/379 |
| 2009/0134218 A1* | 5/2009 | Yuzon | G07F 7/1016 235/382 |
| 2009/0144556 A1 | 6/2009 | Plet et al. | |
| 2009/0173782 A1* | 7/2009 | Muscato | G06Q 20/10 235/379 |
| 2009/0248579 A1* | 10/2009 | Kaminski | G06Q 20/3674 705/67 |
| 2009/0307493 A1 | 12/2009 | Smith | |
| 2009/0313168 A1 | 12/2009 | Manessis | |
| 2010/0023453 A1 | 1/2010 | Keresman, III et al. | |
| 2010/0084476 A1 | 4/2010 | Zellner et al. | |
| 2010/0114776 A1 | 5/2010 | Weller et al. | |
| 2010/0223184 A1 | 9/2010 | Perlman | |
| 2010/0257102 A1 | 10/2010 | Perlman | |
| 2010/0274692 A1 | 10/2010 | Hammad | |
| 2010/0274721 A1 | 10/2010 | Hammad | |
| 2010/0293189 A1 | 11/2010 | Hammad | |
| 2010/0293382 A1* | 11/2010 | Hammad | H04L 9/3234 713/173 |
| 2010/0306105 A1 | 12/2010 | Walker et al. | |

(56) References Cited

U.S. PATENT DOCUMENTS

| | | | |
|---|---|---|---|
| 2011/0101093 A1* | 5/2011 | Ehrensvard | G06Q 20/12 235/380 |
| 2011/0106601 A1 | 5/2011 | Perlman et al. | |
| 2011/0106674 A1 | 5/2011 | Perlman et al. | |
| 2011/0106675 A1 | 5/2011 | Perlman | |
| 2011/0119155 A1 | 5/2011 | Hammad et al. | |
| 2011/0186626 A1 | 8/2011 | Manessis et al. | |

OTHER PUBLICATIONS

U.S. Appl. No. 12/032,495 , "Non-Final Office Action", dated Jun. 10, 2010, 8 pages.
U.S. Appl. No. 12/032,495 , "Non-Final Office Action", dated Jun. 26, 2009, 9 pages.
U.S. Appl. No. 12/032,495 , "Notice of Allowance", dated Sep. 2, 2010, 7 pages.
U.S. Appl. No. 12/483,419 , "Final Office Action", dated May 8, 2012, 12 pages.
U.S. Appl. No. 12/483,419 , "Final Office Action", dated Nov. 13, 2015, 41 pages.
U.S. Appl. No. 12/483,419 , "Final Office Action", dated Jun. 8, 2017, 52 pages.
U.S. Appl. No. 12/483,419 , "Final Office Action", dated Apr. 24, 2013, 9 pages.
U.S. Appl. No. 12/483,419 , "Non Final Office Action", dated Sep. 11, 2014, 11 pages.
U.S. Appl. No. 12/483,419 , "Non-Final Office Action", dated May 29, 2014, 11 pages.
U.S. Appl. No. 12/483,419 , "Non-Final Office action", dated Oct. 4, 2011, 13 pages.
U.S. Appl. No. 12/483,419 , "Non-Final Office Action", dated May 7, 2015, 28 pages.
U.S. Appl. No. 12/483,419 , "Non-Final Office Action", dated Dec. 6, 2016, 54 pages.
U.S. Appl. No. 12/483,419 , "Non-Final Office Action", dated Oct. 18, 2012, 9 pages.
U.S. Appl. No. 12/483,419 , "Notice of Allowance", dated Feb. 22, 2018, 22 pages.
"U.S. Appl. No. 12/778,446", filed May 12, 2010, 56 pages.
"U.S. Appl. No. 12/778,459", filed May 12, 2010, 58 pages.
"U.S. Appl. No. 12/778,485", filed May 12, 2010, 60 pages.
"U.S. Appl. No. 12/939,963", filed Nov. 4, 2010, 115 pages.
U.S. Appl. No. 12/958,191 , "Final Office Action", dated Oct. 26, 2012, 17 pages.
U.S. Appl. No. 12/958,191 , "Non-Final Office Action", dated Jun. 28, 2011, 11 pages.
U.S. Appl. No. 12/958,191 , "Non-Final Office Action", dated Feb. 17, 2012, 15 pages.
U.S. Appl. No. 12/958,191 , "Non-Final Office Action", dated Jan. 14, 2014, 17 pages.
U.S. Appl. No. 12/958,191 , "Notice of Allowance", dated Sep. 15, 2014, 8 pages.
"U.S. Appl. No. 61/061,936", filed Jun. 16, 2008, 14 pages.
"U.S. Appl. No. 61/112,124", filed Nov. 6, 2008, 11 pages.
"U.S. Appl. No. 61/178,636", filed May 15, 2009, 33 pages.
"U.S. Appl. No. 61/256,095", filed Oct. 29, 2009, 40 pages.
"U.S. Appl. No. 61/256,136", filed Oct. 29, 2009, 64 pages.
"U.S. Appl. No. 61/256,141", filed Oct. 29, 2009, 38 pages.
"U.S. Appl. No. 61/256,143", filed Oct. 29, 2009, 29 pages.
"U.S. Appl. No. 61/256,147", filed Oct. 29, 2009, 41 pages.
"U.S. Appl. No. 61/258,194", filed Nov. 4, 2009, 59 pages.
PCT/US2009/047119 , "International Search Report and Written Opinion", dated Aug. 7, 2009, 9 pages.

* cited by examiner

214

| Transaction Number | Dynamic Verification Value |
|---|---|
| 1 | 867 |
| 2 | 148 |
| 3 | 360 |
| 4 | 089 |
| 5 | 388 |
| 6 | 476 |
| 7 | 136 |
| 8 | 588 |
| 9 | 908 |
| 10 | 025 |
| 11 | 673 |
| 12 | 045 |
| 13 | 259 |
| 14 | 676 |
| 15 | 346 |
| 16 | 967 |
| 17 | 858 |
| 18 | 462 |
| 19 | 153 |
| 20 | 500 |
| 21 | 934 |
| 22 | 435 |
| 23 | 385 |
| 24 | 081 |
| 25 | 553 |
| 26 | 793 |
| 27 | 146 |
| 28 | 111 |
| 29 | 857 |
| 30 | 725 |
| 31 | 010 |
| 32 | 967 |
| 33 | 827 |
| 34 | 516 |
| 35 | 078 |
| 36 | 255 |

SYSTEM AND METHOD FOR AUTHORIZING FINANCIAL TRANSACTIONS WITH ONLINE MERCHANTS

CROSS REFERENCE TO RELATED APPLICATIONS

This application is a non-provisional continuation application of and claims the benefit of and priority to U.S. patent application Ser. No. 12/483,419, entitled, "SYSTEM AND METHOD FOR AUTHORIZING FINANCIAL TRANSACTIONS WITH ONLINE MERCHANTS," filed Jun. 12, 2009, which claims the benefit of priority under 35 U.S.C. Section 119(e) to U.S. Provisional Application Ser. No. 61/061,936, filed Jun. 16, 2008, entitled, "METHOD AND SYSTEM OF AUTHENTICATING A FINANCIAL PRESENTATION DEVICE USING A TOKEN," which are fully incorporated by reference herein.

FIELD OF THE INVENTION

The present invention relates to data processing, and more particularly relates to a system and method for authorizing financial transactions of online merchants.

BACKGROUND OF THE INVENTION

The ability to conduct financial and commercial transactions online via the World Wide Web has proven to be a great convenience and a boost to economic activity. Since payments to online merchants generally cannot be done with cash or checks, most online merchants accept payments from their customers via payment accounts such as credit or debit card accounts. However, when using such payment accounts in online transactions, there is an associated risk of counterfeit and fraud because such payment account information can be discovered and pirated by unauthorized parties. For example, if a customer uses a financial presentation device such as a credit card or debit card to make a purchase online, the name of the customer, the credit card number and expiration date, and other sensitive information is entered through the online merchant's web page and passed electronically through a communication channel that may be compromised.

One way to prevent the unauthorized third party use of a financial presentation device is to require the use of dynamic verification data each time a transaction takes place. Dynamic verification data is data that is uniquely associated with a specific financial presentation device, wherein the verification data dynamically changes from transaction to transaction. Therefore, even if a third party was able to steal the account information including the verification data used during a transaction, such information would be insufficient for subsequent unauthorized transactions because they would require different verification data.

Commonly assigned U.S. patent application Ser. No. 12/032,095 entitled "DYNAMIC PAYMENT DEVICE CHARACTERISTICS", which is incorporated by reference herein, describes a system and method in which a credit card is embedded with a display and a processor that is adapted to generate a number shown on the display. This number is dynamically generated for each transaction and can be used as a card verification value (CVV). Accordingly, this dynamically generated CVV can be entered as verification data (e.g., via a keyboard) onto a web page provided by a merchant web site during check out.

However, it has been found that providing a financial presentation device with a processor and display is not cost-effective and requires a significant change in the manufacturing process of financial presentation devices. It would be desirable to find an equally secure, convenient and cost-effective system and method for generating dynamic verification data for financial presentation devices.

SUMMARY OF THE DISCLOSURE

The present invention provides a system for authorizing a financial transaction of a financial presentation device that is presentable to online merchants. The system comprises a peripheral device that includes: 1) a memory for storing information used to generate a dynamic verification value for the financial presentation device, 2) an I/O interface adapted to be coupled to a user computer; and 3) a processor configured to generate a dynamic verification value for the financial transaction using the information stored in memory and to transmit the dynamic verification value to the user computer via the I/O interface. The system also comprises an authentication computer that includes: 1) a memory for storing information used to generate a comparison verification value, 2) a communication device adapted to receive the dynamic verification value generated by the peripheral device, 3) a processor coupled to the memory and the communication device, and 4) an authentication module executable by the processor and adapted to generate the comparison verification value using the information stored in memory and to determine whether to authorize the financial transaction based on a comparison between the comparison verification value and the dynamic verification value.

DETAILED DESCRIPTION OF THE INVENTION

For purposes of illustration and clarity, the present invention will be discussed in the context of using a credit card. However, persons of ordinary skill in the art will appreciate that the novel features disclosed herein apply to all types of portable financial presentation devices including, but not limited to, credit cards, debit cards, prepaid cards, electronic benefit cards, charge cards, smart cards, virtual cards, key chain devices, personal digital assistants, cell phones, stored value devices or the like so long as the device can be presented to a seller of goods or services for payment.

According to the present invention, an electronic peripheral device having an I/O interface for insertion into a port of a computer, such as a universal serial bus (USB) connector, is adapted to store either a series of verification values (e.g., a table of values) or an algorithm that dynamically generates verification values for authorizing a financial presentation device, such as a credit or debit card. During an online transaction, the peripheral device may be used by a customer during checkout to verify that the financial presentation device is being presented by an authorized user. When a customer enters information onto a web form of an online merchant site via a browser program, the peripheral device can generate the dynamic verification data associated with the customer's financial presentation device account and deliver the verification data to the browser program, i.e., by automatically filling in data into a web form of the online merchant site during checkout. During authorization of the transaction, a financial transaction facilitator, such as VISANET™, or the issuer of the financial presentation device, receives the dynamic verification value and compares the verification value against a comparison verification value. The comparison verification value is generated using a series of data that corresponds to the series of dynamic verification values stored in the peripheral device, or by using an algorithm that corresponds to an algorithm stored on the peripheral device. When the dynamic verification value and the comparison verification value match, the customer's financial presentation device is authenticated and the financial transaction facilitator or issuer authorizes the online transaction.

Figure 1:
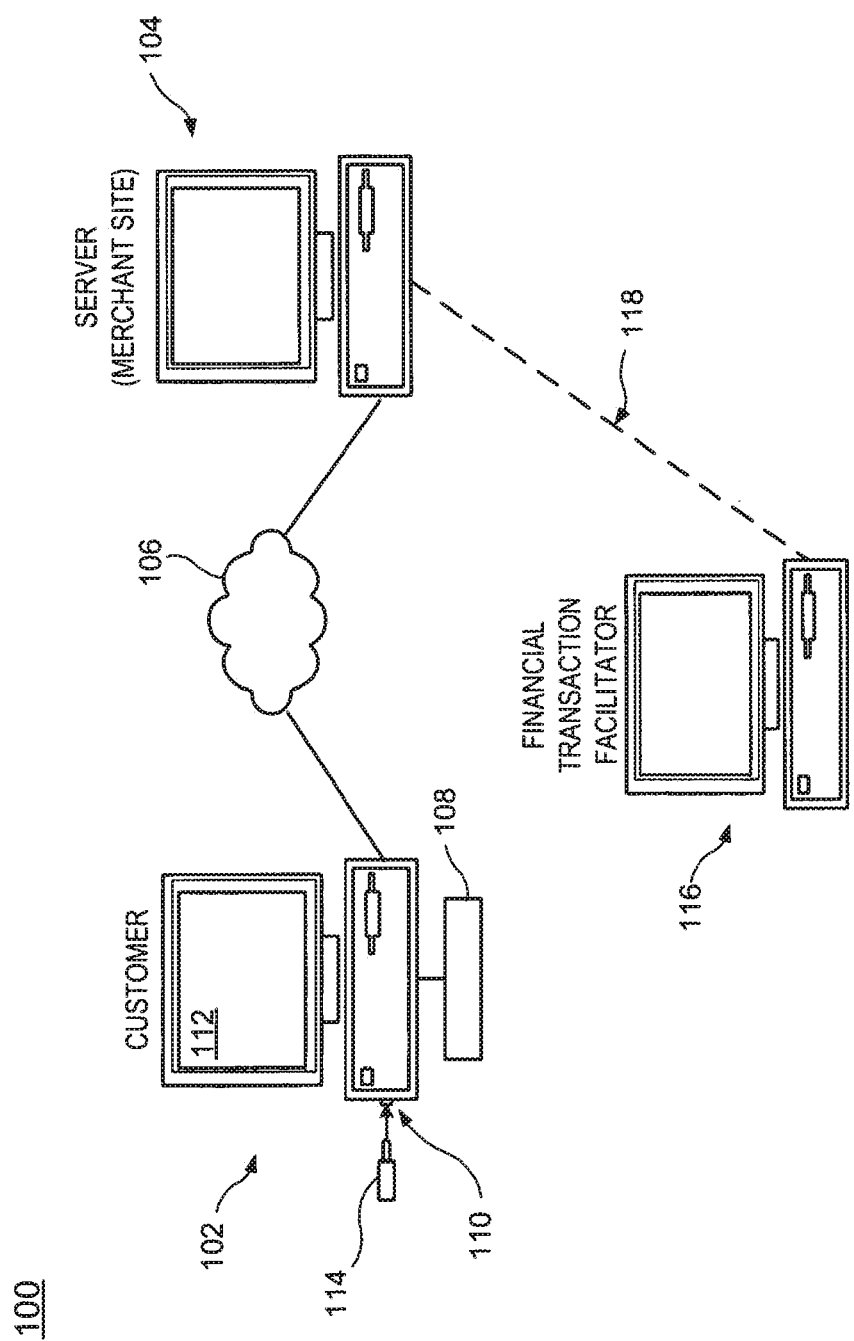
FIG. 1 is a block diagram of a system for dynamically authenticating a financial presentation device presentable to merchants according to an embodiment of the present invention.

FIG. 1 illustrates a block diagram of an exemplary system 100 for dynamically authenticating a financial presentation device according to an embodiment of the present invention. A customer computer 102 is coupled to a merchant server computer 104 that hosts an online merchant site over a public network 106 such as the Internet. Computer 102 includes, among other components, an input device such as a keyboard 108, one or more universal serial bus (USB) ports 110, and a display 112. Computer 102 executes a browser program for viewing HTML, XML documents on display 112. Computer 102 also includes an operating system (not shown) having commonly included device drivers including a HID (Human Interface Device) class driver and related specific device drivers.

The online merchant web site hosted by server 104 may display details of goods and services which the customer may select to purchase. The merchant web site will typically include a payment details screen (not shown) during "checkout" into which the customer may enter payment details via an input device 108 coupled to computer 102. The customer typically enters name, address and payment instrument information such as the account number and expiration date of a financial presentation device in the payment details screen.

According to the present invention, a peripheral device 114, which in some embodiments may be a USB peripheral device, is insertable into USB port 110 of computer 102 during checkout. The peripheral device 114 is initially configured by a financial presentation device authorizing entity 116 such as VISANET™ or the issuer of the financial presentation device. The peripheral device 114 includes functionality to generate a dynamic verification value (such as a three-digit number) based on stored values and/or an algorithm, and to emulate a keyboard so as to automatically input the generated dynamic verification value into an appropriate field of the payment details screen during checkout. As discussed below, computer 102 includes software (possibly downloaded as an applet from the merchant server 104) which is adapted to monitor for the presence of peripheral device 114 and includes a driver for converting signals received from the peripheral device into keyboard input information.

More specifically, peripheral device 114 is configured to include dynamic verification data that uniquely corresponds with a particular financial presentation device before the financial presentation device is assigned to a particular customer. The peripheral device 114 is then given to the customer along with the financial presentation device when it is issued. The peripheral device 114 is then used by the customer when performing online transactions with the financial presentation device to generate dynamic verification values, as described below. The authorizing entity 116 accordingly stores comparison verification values and/or algorithms corresponding to those stored on peripheral device 114, so that the values generated by peripheral device 114 can be verified by the authorizing entity 116. After verifying that the value generated by the peripheral device 114 matches the value stored by the authorizing entity 116, the associated financial presentation device is authorized by the authorizing entity 116 for that particular transaction.

After the customer has entered all of the requested information including the dynamic verification value into the payment details screen during checkout, the information is transmitted to server 104, which in turn sends the payment information to authorizing entity 116 over a secure private network 118. As discussed above, the authorizing entity 116 may be a financial transaction facilitator, such as VISANET™, which determines whether the dynamic verification value received from server 104 has been generated by an authorized peripheral device 114.

Figure 2:
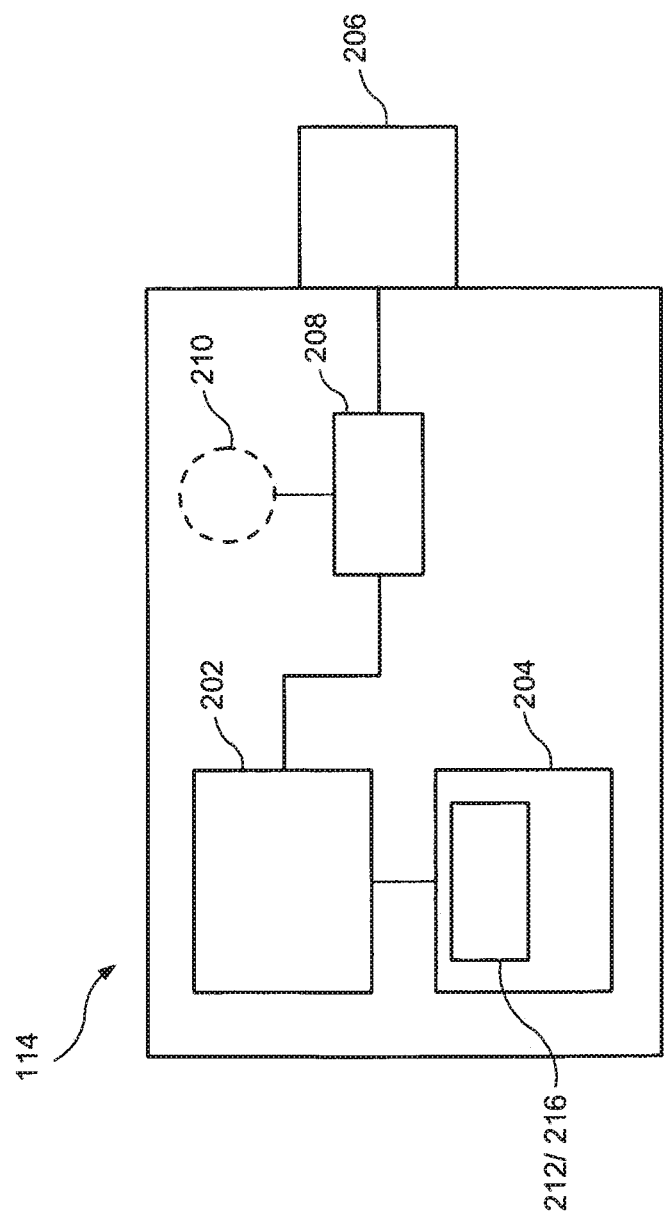
FIG. 2 is a block diagram of an exemplary peripheral device for generating dynamic verification values according to an embodiment of the present invention.

FIG. 2 is a block diagram of an exemplary peripheral device 114 for generating dynamic verification values according to an embodiment of the present invention. Peripheral device 114 includes a processor 202, which may be an inexpensive microprocessor chip or wired logic, and non-volatile memory 204 such as flash memory coupled to processor 202. Processor 202 is coupled to a I/O connector 206 via a switch 208, which may be manually activated by the customer through an activation mechanism 210 such as a button. Connector 206 is preferably a standard USB connector, which is generally available on any personal computer. In one embodiment, peripheral device 114 does not include a power source of its own and only receives power when connected to computer 102 via connector 206. Once the peripheral device 114 is connected to computer 102, the customer may then power on or off the peripheral device 114 by activating or deactivating switch 208, which allows or prevents power from reaching processor 202 from connector 206. In another embodiment, the peripheral device 114 is always powered on whenever it is connected to computer 102.

Figure 3:
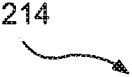
FIG. 3 shows a portion of a table of preset dynamic verification values for a financial presentation device according to an embodiment of the present invention.

In some embodiments, memory 204 of peripheral device 114 stores a keyboard emulation module 212 and in one embodiment, stores a table 214 of financial presentation device verification values (see FIG. 3). Keyboard emulation module 212 is adapted to output signals that a HID (Human Input Device) class driver (not shown) of the operating system of computer 102 recognizes as signals outputted from a standard keyboard device. The HID class driver causes the data to be delivered to a keyboard driver of the operating system of computer 102. In this manner, the peripheral device 114 may mimic the operation of a numerical keypad on a standard keyboard. Alternatively, the checkout webpage of the merchant server 104 may download an applet into the user computer 102 such that it requests and receives the dynamic verification value from the peripheral device 114, and automatically fills in the corresponding input field of the checkout page.

In an exemplary embodiment, memory 204 of peripheral device 114 stores a table 214 which includes a number (e.g., between 10 and 1000) of preset 3-digit dynamic verification values, which are indexed by a transaction number. In other embodiments the dynamic verification values can be 4-digit, 5-digit, or any other number of digits. FIG. 3 illustrates a portion of a table 214 according to one example, including the dynamic verification values which correspond to the first thirty-six (36) transaction numbers. The keyboard emulation module 212 keeps track of the last transaction number that was used to generate the dynamic verification value and is adapted to extract the dynamic verification values from table 214 in sequence, preferably starting with the value associated with transaction number 1. The keyboard emulation module 212 then moves consecutively to the next transaction dynamic verification value for each new transaction or each time the processor is powered on via switch 208. Upon extracting a dynamic verification value, the keyboard emulation module 212 converts the value into signals that the keyboard driver of computer 102 will recognize as signals generated by entering the corresponding numbers using a keyboard.

In alternative embodiments, memory 204 may store an algorithm or value generation module 216 which generates a new dynamic verification value upon activation based on certain stored kernel information such as the account number of the financial presentation device. Exemplary algorithms that may be used to generate dynamic verification values are discussed below and in commonly-assigned U.S. patent application Ser. No. 10/642,878 entitled "Method and System for Generating a Dynamic Verification Value". In these embodiments, the keyboard emulation module 212 receives the newly generated dynamic verification value from value generation module 216 and formats the value in the form of keyboard output signals accordingly.

Two example algorithms that may be used to generate dynamic verification values are counter-based and time-based algorithms, both of which use variable data together with customer account information to generate dynamic verification values.

In a counter-based algorithm a transaction counter stored in the peripheral device increments with each transaction. In one example algorithm, a string is constructed by replacing certain digits of the customer's financial presentation device account number with the transaction counter to create an 'altered account number'. In a second step, the altered account number is concatenated with the expiration date of the account and with other specified digits. The concatenated result is placed into a 128-bit field, and then spit into two blocks, block A and block B. Block A is then encrypted using an encryption key, and the encrypted result (block C) is put through an exclusive OR operation with block B. Resulting block D is then encrypted with the encryption key. After further encryptions, hexadecimal digits are converted into decimal, the blocks are concatenated, and three digits are selected from the concatenated result as the dynamic verification value.

In an example time-based algorithm, the process may be similar, with a time-based number (based on a known time window) used instead of a transaction counter to create the altered account number.

According to these algorithms, even if an unauthorized party was able to obtain financial presentation device account number and expiration date information, there would be no way for the unauthorized party to precisely determine the dynamic verification value without the variable data of a transaction counter or time-based number. Moreover, if an unauthorized party uses a number generating algorithm to continually guess at the dynamic verification value, verification may be disallowed after a certain number (e.g., 2 or 3) of unsuccessful attempts.

Figure 4:
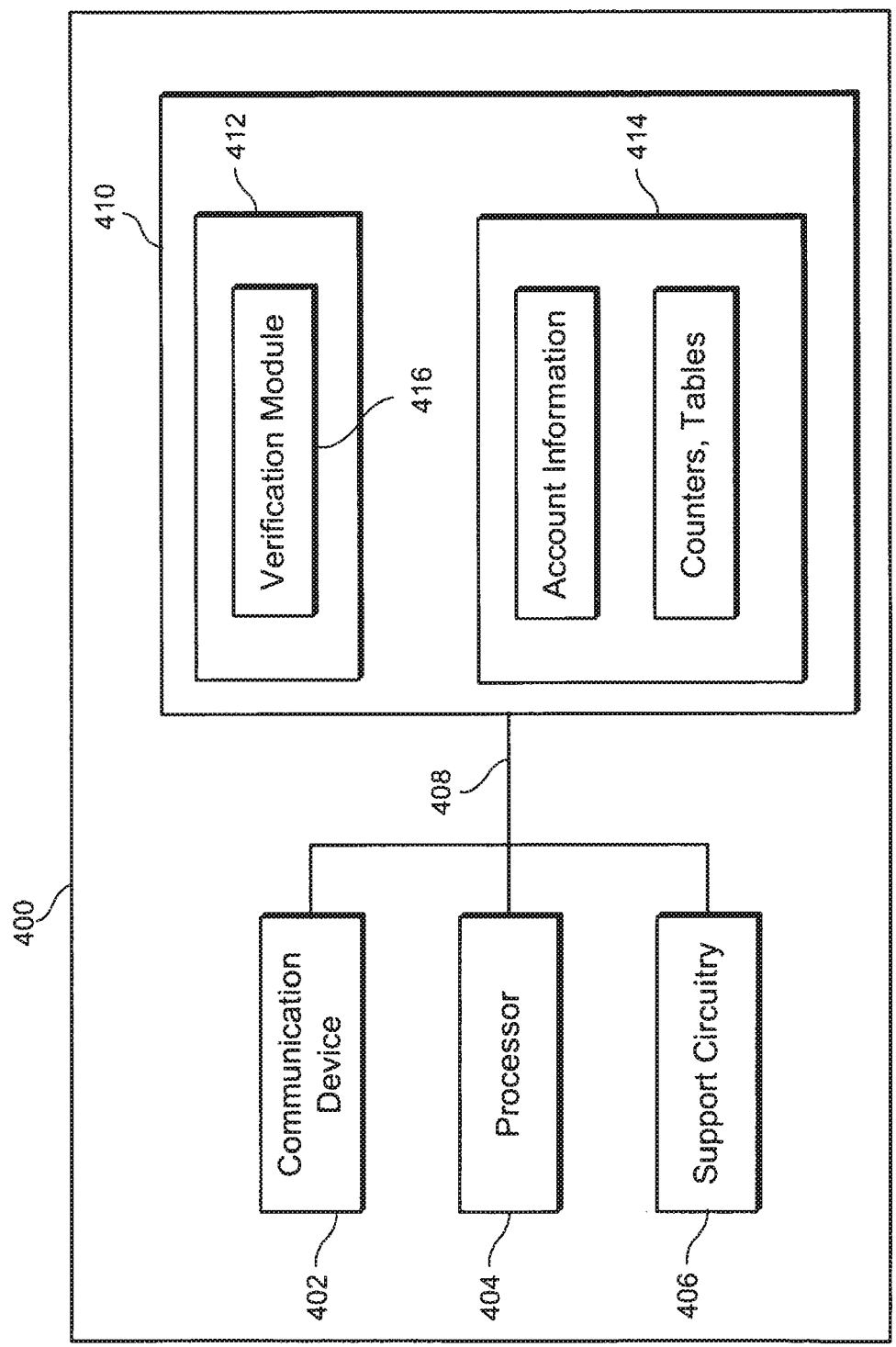
FIG. 4 is a block diagram of an exemplary computer implemented by an authorizing entity that performs authentication of dynamic verification values according to an embodiment of the present invention.

FIG. 4 is a block diagram of an exemplary computer system 400 which may be implemented by authorizing entity 116 for authenticating financial transactions performed using financial presentation devices. In preferred embodiments of the present invention, computer system 400 is implemented at or operated by a financial transaction facilitator such as VISANET. Computer system 400 includes a communication device 402 which sends/receives information via a communication link (not shown) to customer computers 102 and merchant servers 104 although the signal may pass through multiple networks and computers (see FIG. 1), a processor 404, such as a central processing unit (CPU), and support circuitry 406. The communication device 402, processor 404, and support circuitry 406 are commonly connected to a bus 408 which also connects to a memory 410. Memory 410 includes program storage memory 412 and data storage memory 414.

Program storage memory 412 and data storage memory 414 may each comprise volatile (RAM) and non-volatile (ROM) memory units and may also comprise hard disk and backup storage capacity. Program storage memory 412 stores software program modules and associated data, and in particular stores a verification module 416. Verification module 416 is adapted to receive the dynamic verification value generated by peripheral device 114 and to match the dynamic verification value against a comparison verification value which is obtained from a set of stored values (e.g., in a table) or generated by an algorithm that corresponds to the algorithm used to generate the dynamic verification value by peripheral device 114. Received dynamic verification values may be stored in data storage memory 414 along with other stored cardholder information, a table of stored dynamic verification values, and/or values/parameters such as a transaction counter used for generating comparison verification values dynamically according to an algorithm.

It is to be appreciated that the computer system 400 can be any computer such as a personal computer, minicomputer, workstation, mainframe, or a combination thereof. While the computer system 400 is shown, for illustration purposes, as a single computer unit, the system may comprise a group/farm of computers which can be scaled depending on the processing load and database size.

Figure 5:
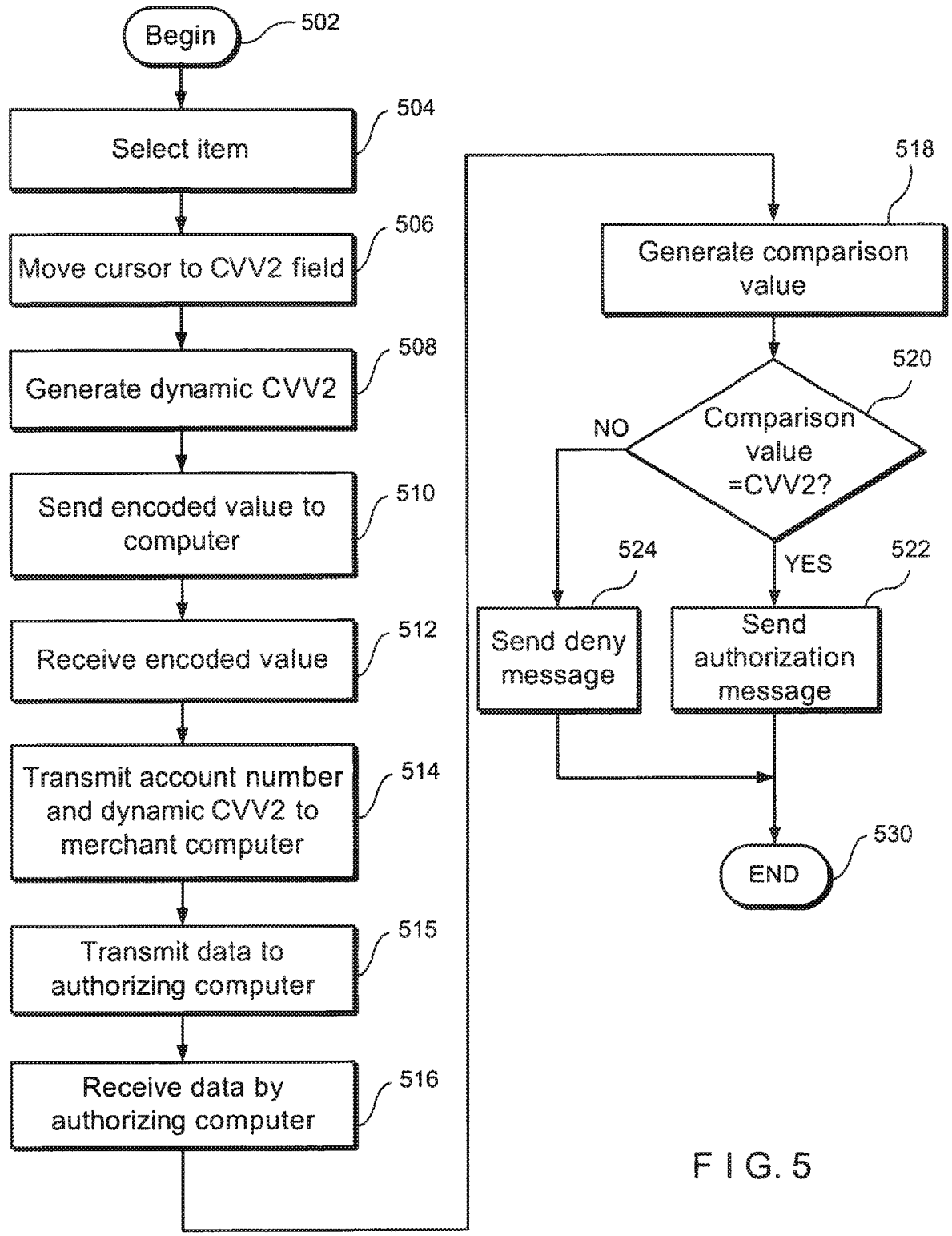
FIG. 5 is a flow chart of a method of dynamically authorizing a financial transaction of a financial presentation device that is presentable to merchants according to the present invention.

FIG. 5 illustrates a flow chart of a method for authenticating a financial transaction in which a peripheral device according to the present invention is used to generate dynamic verification values for the financial presentation device. The method begins in step 502. In step 504, a customer at computer 102 selects an item to purchase on an online merchant site, which then generates a payment details screen during checkout. In step 506, after providing whatever information needs to be input manually, if any, the customer moves the cursor to a dynamic verification value (CVV2) field (e.g., input box) in the payment details screen, and in step 508, activates peripheral device 114 to generate a dynamic verification value which will be inputted into the dynamic verification value field.

In one embodiment, the processor 202 retrieves the last used transaction counter/number and increments it by one and retrieves the verification value corresponding to the new transaction number. For example, if the last used transaction number was 15, the retrieved verification value is 967 (corresponding to transaction number 16) according to the table in FIG. 3. The processor 202 then resets the last used transaction number to 16.

Alternatively, an applet downloaded from the merchant server 104 and running inside the user computer 102 may prompt the user to plug the peripheral device 114 into the computer 102. When the user does so, the processor 202 retrieves an appropriate dynamic verification value from the table 214 as described above and transmits it through the usb port.

In step 510, peripheral device 114 generates a signal that encodes the dynamic verification value as keyboard input and sends the encoded value to user computer 102. In step 512, user computer 102 receives the signal from peripheral device 114 and interprets the signal as keyboard input instructions and enters the dynamic verification value into the dynamic verification value field of the payment details screen.

Upon completion of the payment details screen, in step 514, the online merchant server 104 receives transaction data, including the financial presentation device account number and dynamic verification value. In step 515, merchant server 104 provides the financial presentation device information and dynamic verification value to an acquirer (not shown) using conventional financial presentation device authentication procedures. In step 516, the transaction data is then received from the acquirer by an authorizing computer 400 of the authorizing entity 116. Upon receiving the transaction data including the dynamic verification value, in step 518, the verification module being executed by the processor 404 of authorizing computer 400 generates a comparison verification value to compare with the received dynamic verification value. As explained above, the comparison verification value may be generated using a table corresponding to a table of verification values stored on peripheral device 114, or based on an algorithm that corresponds to an algorithm stored on peripheral device 114.

In the case of using the table, like the peripheral device 114, the verification module 416 maintains the same table and the same last used transaction number. The module 416 increments the last used transaction number by one and retrieves the verification value corresponding to the new transaction number. For example, if the last used transaction number was 15, the retrieved verification value is 967 (corresponding to transaction number 16) according to the table in FIG. 3. The verification module 416 then resets the last used transaction number to 16. The module 416 uses the retrieved value as the comparison verification value.

In step 520, verification module 416 determines whether the comparison verification value matches the dynamic verification value received from the online merchant server 104.

If it is determined in step 520 that the comparison verification value matches the dynamic verification value, then, in step 522, verification module 416 authorizes the transaction (assuming of course that all other tests such as credit limit pass) and sends a notification to the merchant server 104 according to conventional procedures. The method then ends in step 530.

If it is determined in step 520 that the comparison verification value does not match the dynamic verification value, then, in step 524, verification module 416 sends a notification to the merchant server 104 that the financial transaction is denied. The method then ends in step 530.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A method, comprising:
maintaining, by an authentication computer, variable data that changes for each of a plurality of financial transactions, the variable data that changes for each of the plurality of financial transactions being a time-based number;
receiving, by the authentication computer and from a computing device as part of a financial transaction conducted with a financial presentation device, a dynamic verification value generated uniquely for the financial transaction by a peripheral device distinct from the authentication computer, computing device, and financial presentation device, the peripheral device independently storing a copy of the variable data changes for each of the plurality of financial transactions, wherein the dynamic verification value is generated based at least in part on data from the financial presentation device and the copy of the variable data maintained by the peripheral device, wherein the peripheral device is caused to:
   receive a request from the computing device for the dynamic verification value, the request including details of the transaction;
   transmit the dynamic verification value to the computing device; and
   update the copy of the variable data upon transmitting the dynamic verification value to the authentication computer;
responsive to receiving the dynamic verification value, generating, by the authentication computer, a comparison verification value, the comparison verification value being based at least in part on data from the financial presentation device and the variable data that changes for each of the plurality of financial transactions;
responsive to the generated comparison verification value, updating, by the authentication computer, the variable data such that the variable data changes for each of the plurality of financial transactions;
responsive to generating the comparison verification value, comparing, by the authentication computer, the comparison verification value with the dynamic verification value; and
determining, by the authentication computer, whether to authorize the financial transaction based at least in part on the comparison between the comparison verification value and the dynamic verification value.

2. A method in accordance with claim 1, wherein the peripheral device comprises a USB device connectable to the computing device with a USB port.

3. A method in accordance with claim 1, wherein the peripheral device corresponds uniquely to the financial presentation device.

4. An authentication computer system configured to, at least:

maintain variable data that changes for each of a plurality of financial transactions, the variable data that changes for each of the plurality of financial transactions being a time-based number;
receive, from a computing device as part of a financial transaction conducted with a financial presentation device, a dynamic verification value generated uniquely for the financial transaction by a peripheral device distinct from the authentication computer system, computing device, and financial presentation device, the peripheral device independently storing a copy of the variable data changes for each of the plurality of financial transactions, wherein the dynamic verification value is generated based at least in part on data from the financial presentation device and the copy of the variable data maintained by the peripheral device, wherein the peripheral device is caused to:
  receive a request from the computing device for the dynamic verification value, the request including details of the transaction;
  transmit the dynamic verification value to the computing device; and
  update the copy of the variable data upon transmitting the dynamic verification value to the authentication computer;
responsive to receiving the dynamic verification value, generate a comparison verification value, the comparison verification value being based at least in part on data from the financial presentation device and the variable data that changes for each of the plurality of financial transactions;
responsive to the generated comparison verification value, update the variable data such that the variable data changes for each of the plurality of financial transactions;
responsive to generating the comparison verification value, compare the comparison verification value with the dynamic verification value; and
determine whether to authorize the financial transaction based at least in part on the comparison between the comparison verification value and the dynamic verification value.

5. One or more non-transitory computer-readable media collectively storing thereon computer-executable instructions that, when executed with one or more computers, at least:

maintain variable data that changes for each of a plurality of financial transactions, the variable data that changes for each of the plurality of financial transactions being a time-based number;
receive, from a computing device as part of a financial transaction conducted with a financial presentation device, a dynamic verification value generated uniquely for the financial transaction by a peripheral device distinct from the one or more computers, computing device, and financial presentation device, the peripheral device independently storing a copy of the variable data changes for each of the plurality of financial transactions, wherein the dynamic verification value is generated based at least in part on data from the financial presentation device and the copy of the variable data maintained by the peripheral device, wherein the peripheral device is caused to:
  receive a request from the computing device for the dynamic verification value, the request including details of the transaction;
  transmit the dynamic verification value to the computing device; and
  update the copy of the variable data upon transmitting the dynamic verification value to the one or more computers;
responsive to receiving the dynamic verification value, generate a comparison verification value, the comparison verification value being based at least in part on data from the financial presentation device and the variable data that changes for each of the plurality of financial transactions;
responsive to the generated comparison verification value, update the variable data such that the variable data changes for each of the plurality of financial transactions;
responsive to generating the comparison verification value, compare the comparison verification value with the dynamic verification value; and
determine whether to authorize the financial transaction based at least in part on the comparison between the comparison verification value and the dynamic verification value.

\* \* \* \* \*